United States Patent [19]

Roy et al.

[11] Patent Number: 4,587,172

[45] Date of Patent: May 6, 1986

[54] MIRROR SUBSTRATE OF ATOMICALLY SUBSTITUTED NA ZR₂PO₁₂ LOW EXPANSION CERAMIC MATERIAL

[75] Inventors: Rustum Roy, State College, Pa.; Jaime Alamo, Velencia, Spain

[73] Assignee: The Perkin-Elmer Corporation, Norwalk, Conn.

[21] Appl. No.: 616,368

[22] Filed: Jun. 1, 1984

[51] Int. Cl.⁴ .................... B32B 18/00; C01B 25/37; G02B 1/00; G02B 17/00

[52] U.S. Cl. ................................. 428/450; 350/641; 350/320; 423/306; 428/472; 428/699; 428/701; 428/912.2; 501/102

[58] Field of Search ............. 428/450, 472, 699, 701, 428/912.2; 429/193; 423/306; 350/609, 631, 641, 320

[56] References Cited

U.S. PATENT DOCUMENTS

| | | | |
|---|---|---|---|
| 4,049,891 | 9/1977 | Hong et al. | 429/193 |
| 4,166,159 | 8/1979 | Pober | 429/193 |
| 4,340,646 | 7/1982 | Ohno et al. | 350/320 |
| 4,448,855 | 5/1984 | Senaha et al. | 428/472 |
| 4,512,905 | 4/1985 | Clearfield et al. | 429/193 |

FOREIGN PATENT DOCUMENTS 968025  8/1964  United Kingdom ............. 428/912.2

OTHER PUBLICATIONS

Clearfield, A. et al., "Synthesis of Sodium Dizirconium Triphosphate from α-Zirconium Phosphate", Mat. Res. Bull., 15, pp. 1603–1610 (1980).

Boilot, J. P. et al., "Phase Transformation in $Na_{1+x}Si_xZr_2P_{3-x}O_{12}$ Compounds", Material Research Bulletin, vol. 14, pp. 1469–1477, 1979.

Hong, H. Y-P., "Crystal Structures and Crystal Chemistry in the System $Na_{1+x}Zr_2Si_xP_{3-x}O_{12}$", Material Research Bulletin, vol. 11, pp. 173–182, 1976.

Primary Examiner—Helen M. McCarthy
Attorney, Agent, or Firm—Herbert S. Ingham; Thomas P. Murphy; Edwin T. Grimes

[57] ABSTRACT

A low expansion ceramic material has a composition represented by the molecular formula i (Na) j $(Zr_{2-z}Na_{4z})$ k $(P_{3-x}Na_xSi_x)O_{12}$ in which the molar proportions i, j and k are each within the range from about 0.9 to about 1.1, and i+j+k equal 3; and, for molar proportions i, j and k each equal to 1.0, the ceramic composition falls within the area defined by the points A, B, C and D in a quarternary diagram of $SiO_2$, $Na_2O$, $P_2O_5$ and $ZrO_2$, the coordinates of the points being:

A: x=0.2, z=0
B: x=0.6, z=0
C: x=0, z=0.25
D: x=0, z=0.125

The ceramic material is especially suitable as a substrate for optically reflecting films.

4 Claims, 3 Drawing Figures

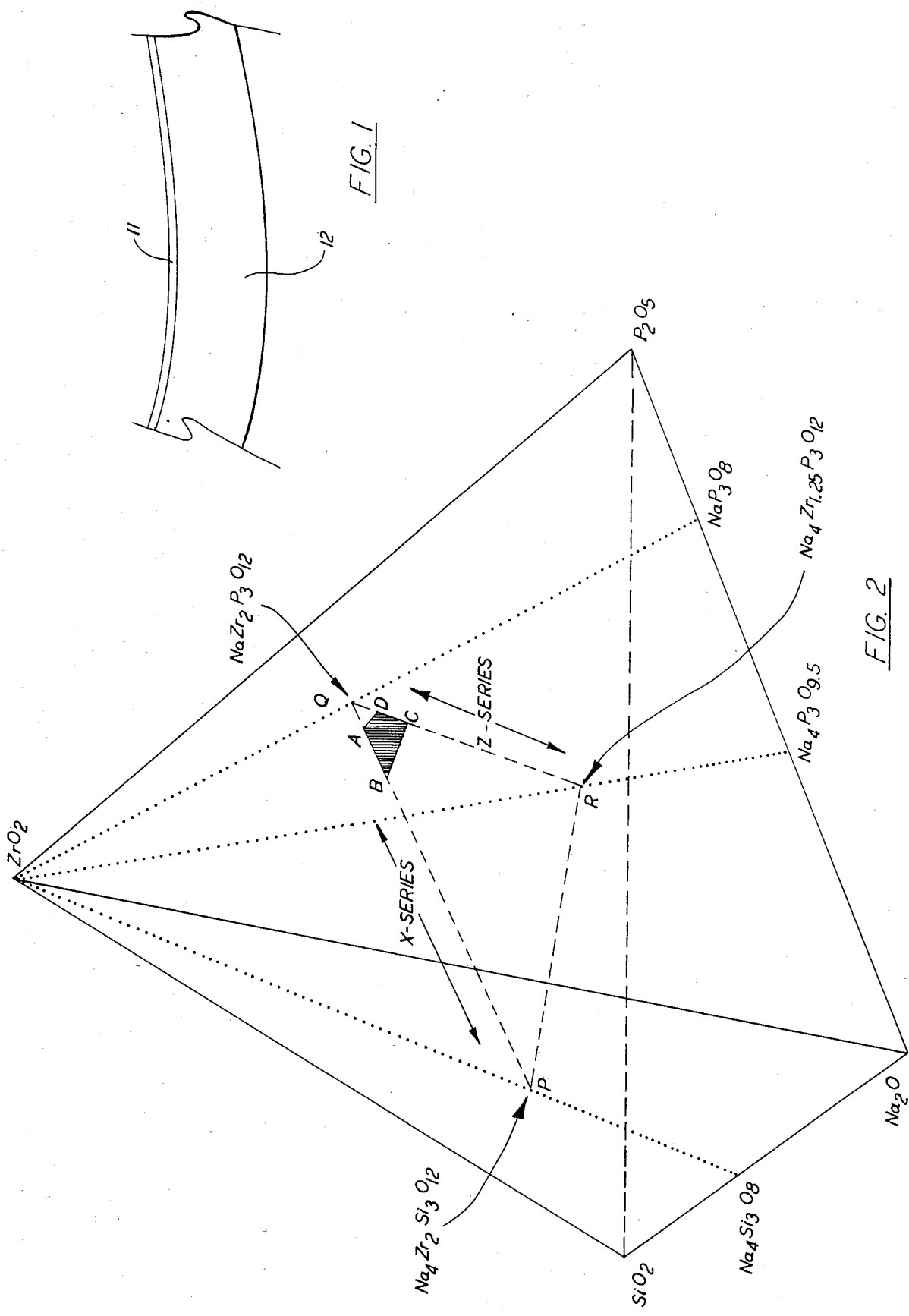

MIRROR SUBSTRATE OF ATOMICALLY SUBSTITUTED NA ZR$_2$PO$_{12}$ LOW EXPANSION CERAMIC MATERIAL

This invention relates in general to low thermal expansion materials and particularly to low expansion optical reflecting structures consisting of an optically reflecting film deposited on a ceramic substrate having nearly zero thermal coefficient of expansion.

BACKGROUND OF THE INVENTION

It is well known that almost every solid substance has a substantial, positive coefficient of thermal expansion, i.e., it expands significantly when heated. Up to the present time three families of crystalline ceramic materials have been found useful in the technology of low expanding ceramics: eucryptite-spodumene (LiAlSiO$_4$-LiAlSi$_2$O$_6$), the main constituent of cooking ware; cordierite (Mg$_2$Al$_4$Si$_5$O$_{18}$), the main component of steatite bodies; and zircon (ZrSiO$_4$), well known for use in refractories. However, most of these known ceramics still have some positive coefficient of thermal expansion.

Components of earth orbiting satellites and instruments used on such satellites are subjected to wide and sometimes sudden changes in temperature in outer space. This occurs as the satellite travels in and out of the direct sunlight and the earth's shadow, or while the satellite itself is spinning, or perhaps when a temperature control system malfunctions. Due to thermal expansion and contraction the sudden changes in temperatures can cause a component to distort or fracture resulting in its failure to carry out its function. This problem is also acute for optical systems in the space environment, specifically for a reflecting film carried on a substrate, where any change can distort an image.

Some applications for mirrors operating even at room temperature are susceptible to distortions from even minute changes in temperature. For example, the demand for increased capacity of integrated circuit chips is pushing the capabilities of microphotolithographic projection devices that depend on mirror systems of extremely high precision.

Even electron beam microlithography instruments—which do not employ mirrors or other optical elements in the ordinary sense—have reached a stage of perfection where dimensional variation in structural components, e.g., the frame, due to even minute changes in ambient temperature, are a factor to be considered in its adverse impact on resolution capability of the apparatus.

One well-known approach to minimizing the problem with composite structures is to fabricate the composite with components having matching thermal expansion characteristics. However, this approach has been found not to succeed as well as desired in the case of thin films on supporting substrates.

Ceramics of the type NaZr$_2$P$_3$O$_{12}$ have been utilized for electrical application involving ionic conductivity. Substitutions of elements are typically made to enhance this conductivity. For example, additional sodium has been substituted for some of the zirconium in a class of compounds, Na$_{1+4z}$Zr$_{2-z}$P$_3$O$_{12}$.

Similarly, silicon and sodium have been substituted jointly for a portion of the phosphorous to create a solid electrolyte which is used in batteries. Such silicon-containing compounds are described as Na$_{1+x}$Si$_x$Zr$_2$P$_{3-x}$O$_{12}$. J. P. Boilot and J. P. Salantie, as reported in "Phase Transformation in Na$_{1+x}$Si$_x$Zr$_2$P$_{3-x}$O$_{12}$ Compounds", Material Research Bulletin Vol. 14, pp. 1469–1477, 1979, studied phase transformation in the latter class of compounds, and compared this feature with thermal expansion for the range of compositions corresponding to x ranging from 3 down to 1. As x was decreased from 3 to 2 the thermal expansion coefficient was reported by Boilot, et al. to change inversely, viz., to increase to more than twice its value. At x=1 there was a substantial reversal to a negative thermal expansion coefficient. These changes, in this scientific study, were correlated to changes in crystal structure. In particular, there is a reversible change in crystal structure when the material is heated. Although Boilot mentioned that the compound where x=1 displays an important shrinkage which could allow this material to be used when expansion is undesirable, he also recognized and pointed out the deleterious effect of a crystal structure that transforms upon heating.

Such effects are well known and generally avoided. For example, simple zirconium oxide (ZrO$_2$) changes its crystal structure upon heating and cooling, and fractures itself in the process. Thus zirconium oxide, which is used as a refractory in high temperature barrier applications, is virtually always stabilized by the addition of other elements to prevent the crystal change and the corresponding self-destruction that may occur during extreme thermal changes. Generally those skilled in the art will avoid using any ceramic that changes its crystal structure during temperature changes.

Studies on similar solid electrolytes were reported in H. Y. P. Hong, "Crystal Structures and Crystal Chemistry in the System Na$_{1+x}$Zr$_2$Si$_x$P$_{3-x}$O$_{12}$", Material Research Bulletin, Vol. 11, pp. 173–182, 1976. Values of x from 0 to 3 are included, as are several compounds in the z-series, but no information is provided on thermal expansion.

In view of the foregoing, a primary object of the present invention is to provide an improved process for producing materials having very low or nearly zero coefficient of thermal expansion.

Another object of the present invention is to provide a novel structural component having extremely high dimensional stability which does not distort or fracture in a temperature changing environment.

A further object of the present invention is to provide a novel ceramic substrate which supports an optically reflecting film, has nearly zero thermal expansion coefficient, and does not fracture from changes in crystal structure.

A still further object of this invention is to provide an improved optically reflecting component useful for precision telescopic and microlithography projection system.

BRIEF DESCRIPTION OF THE INVENTION

The foregoing and other objects of the present invention are achieved by providing a ceramic material particularly suitable as a substrate for an optically reflecting film, whereby the ceramic is represented by the molecular formula i (Na) j (Zr$_{2-z}$Na$_{4z}$) k (P$_{3-x}$Na$_x$Si$_x$) O$_{12}$ in which the molar proportions i, j and k are each within the range from about 0.9 to about 1.1, and i+j+k=3; and, for molar proportions i, j and k each equal to 1.0, the ceramic compound has a composition within the area defined by the points A, B, C and D in a $SiO_2$, $Na_2O$, $P_2O$, and $ZrO_2$ quaternary diagram, the coordinates of the points being:

A: $x=0.2, z=0$
B: $x=0.6, z=0$
C: $x=0, z=0.25$
D: $x=0, z=0.125$

BRIEF DESCRIPTION OF THE DRAWINGS

FIG. 1 shows a cross section of a ceramic substrate supporting an optical film;

FIG. 2 shows a view of a 3 dimensional quaternary diagram explaining a range of composition of a ceramic in accordance with the present invention;

DETAILED DESCRIPTION OF THE INVENTION

Figure 3:
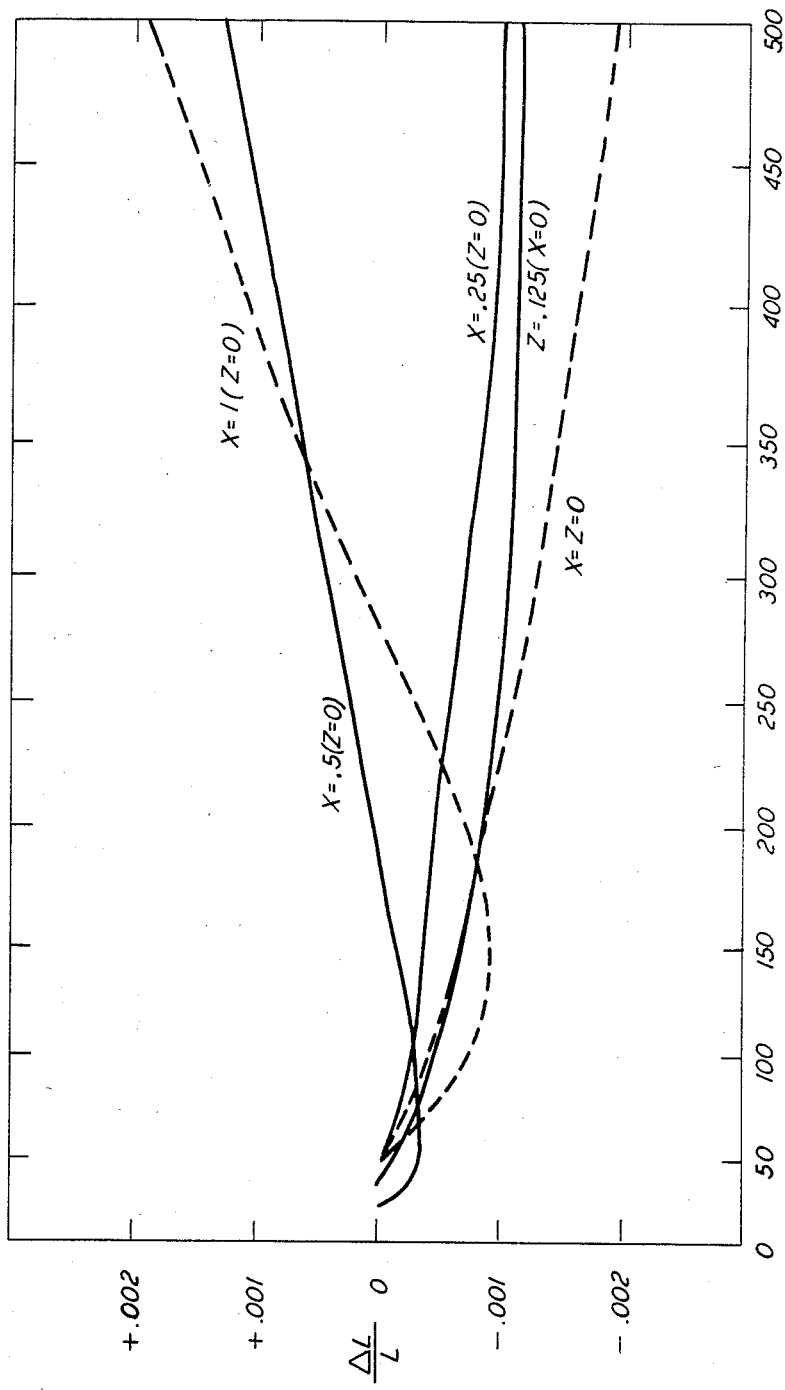
FIG. 3 shows plots of measurements of thermal expansion vs. temperature for three composites of the present invention (in solid line) and for two compositions (in broken line) not within the scope of the present invention.

As illustrated in FIG. 1, the optically reflecting structures of the present invention have a reflecting film 11 deposited on a ceramic substrate 12 formed of zero expansion ceramic of the type $NaZr_2P_3O_{12}$, having certain atomic substitutions as described herein.

FIG. 2 presents a view of a quaternary phase diagram of the molecular constituents $Na_2O$, $SiO_2$, $P_2O_5$ and $ZrO_2$. A plane in this three dimensional diagram is presented by points P, R and Q which are defined, respectively, by the compositions $Na_4Zr_2Si_3O_{12}$, $Na_4Zr_{1.25}P_3O_{12}$, and $NaZr_2P_3O_{12}$. Compositions of the present invention lie near and preferably in that portion of the plane that is within the shaded quadrilateral area bounded by lines joining points A, B, C and D, the coordinates of the points being:

A: $x=0.2, z=0$
B: $x=0.6, z=0$
C: $x=0, z=0.25$
D: $x=0, z=0.125$

The low expansion ceramic compound of the present invention is represented by molecular formula i (Na) j $(Zr_{2-z}Na_{4z})$ k $(P_{3-x}Na_xSi_x)$ $O_{12}$ where i, j and k represent molar proportions and x and z represent atomic proportions of the constituents respectively of the ceramic compound. The molar proportions i, j and k should each be in the range of about 0.9 to about 1.1, and $i+j+k=3$. The atomic proportions x and z are within ranges defined by the area A-B-C-D for the case of $i=j=k=1$.

While the molar fractions i, j and k each should preferably equal 1.0, placing the composition in the quadrilateral area of A-B-C-D, possible variations in the compositions of the present invention from the quadrilateral area A-B-C-D, including deviations away from the plane of A-B-C-D, are indicated in the spirit of the present invention by the permissible values of i, j and k as each being within the range from about 0.9 to about 1.1, so long as $i+j+k=3$.

In accordance with one preferred embodiment of the invention, $x=0$, and sodium (Na) is substituted for a portion of the zirconium (Zr) as represented by the molecular formula i (Na) j $(Zr_{2-z}Na_{4z})$ k $(P_3)$ $O_{12}$ where i, j and k are as set forth above. The atomic fraction z is in the range of about 0.125 to about 0.25 and preferably equals about 0.18. The basic compositional range of this z-series is illustrated by the line C-D in the quaternary diagram of FIG. 2.

In accordance with another preferred embodiment of the invention, $z=0$, and sodium (Na) and silicon (Si) are jointly substituted for a portion of the phosphorous (P) as represented by the molecular formula i (Na) j $(Zr_2)$ k $(P_{3-x}Na_xSi_x)$ $O_{12}$ where i, j and k are as set for the above. The atomic fraction x is in the range of about 0.2 to about 0.6 and preferably equals about 0.4. The basic compositional range of this second embodiment (x-series) is illustrated by the line A-B in FIG. 2.

Compositions between the x-series and z-series may be as set forth above for the area A-B-C-D.

It is important that the structure be substantially single phase. Thus the ceramic may contain minor impurities in amounts up to a few percent, providing such impurities do not cause a significant amount of any second phase to occur.

The ceramic composition, in accordance with the invention, may be formed in any known or desired manner. For example, zirconyl nitrate, ammonium dihydrogen phosphate and sodium carbonate can be mixed in a mortar in the desired proportions and heated in a platinum crucible slowly to 600° C., then held at 900° C. for 2-4 hours.

Alternatively, one may use the known sol-gel technology. For example, the same materials are all dissolved in water, with $SiO_2$ added as an alcoholic solution of $Si(OC_2H_5)_4$, allowed to gel, then desiccated at 400° C. overnight and heated to 900° C. for 2 hours.

In yet another method the silicate $Na_2O3SiO_23H_2O$ is dissolved into a saturated meta silicate $Na_2OSiO_25H_2O$ in order to give solution (a) (pH=11). The proportions of the two silicates depend on the Si/Na ratio in the expected compound. The corresponding amounts of $(NH_4)_2HPO_4$ and $ZrO(NO_3)_2 \cdot 2H_2O$ are dissolved in a minimal quantity of boiling water to give respectively solution (b) (pH=7) and solution (c) (pH=0.4). The simultaneous addition of solutions (a) and (b) to solution (c) when thoroughly stirred lead to the forming of a solid gel-like bulk having pH close to 6 which allows both zirconium phosphate and zirconium hydroxide to precipitate along with the forming of a silica gel. Since the sodium ions must be retained in the gel, solutions (a), (b) and (c) are used in nearly saturated conditions so as to avoid the liquid phase as much as possible. The gel is then dried and heated at about 110° C. for about 12 hours and dehydrated at 500° C.

In one preferred method of preparation the raw materials are mixed together in desired proportions. After rough mixing, the mixture is ground to produce a fine, uniform powder. While any suitable grinding method may be used, ball milling is preferred for convenience and reliability. Preferably, an anti-coagulation agent, such as acetone, is included to prevent coagulation and gelification of the very fine powders used as raw materials. Any suitable mix of grinding balls, powder mixture and anti-coagulant may be used, such as (by volume) ⅓ powder mixture, ⅓ grinding balls and ⅓ acetone. After grinding for an appropriate period, usually for at least about 12 hours, the resulting slurry is removed, dried and the soft agglomerantes produced are forced through a fine mesh screen to homogenize the particle size.

The material is then formed into the desired article shape. Typically, the material may be formed in a hydraulic press at about 10,000 to 50,000 psi. If desired, an organic binder, such as 1 to 2 percent of a 15 percent aqueous polyvinyl alcohol solution may be used to improve pressing uniformity. The binder is evaporated or burned off early in the sintering heating cycle. Other processes, such as slip casting, hot-pressing, etc., will often be preferred in production operations for faster throughput and lower shrinkage. The resulting self-sustaining pressed structure is sintered to produce the desired polycrystalline ceramic. The structure may be sintered at a suitable temperature for a suitable time period that will form a homogenized single phase of the desired composition. Generally, sintering temperatures of about 1100° C. are preferred for optimum density without the formation of an undesirable second phase. Typically, the structure may be sintered in a Lindberg boxtype furnace heated with silicon carbide elements. Disc shaped structures may be supported on zirconia setters and covered with alumina dishes to prevent contamination.

The structures are cooled from the sintering temperature to room temperature over a reasonable time period to avoid thermal shocks. Simply turning the furnace off and allowing it to cool naturally is generally satisfactory and convenient.

In applying the concept of the present invention to optical components, e.g., curved mirrors, a substrate having the desired optical configuration is formed as described above. Then, at least the optically active surface is provided with a reflective coating. Typically, the coating is a metal; aluminum is probably the most common, but silver, gold or any other suitable metal may be employed. Mult-layer dielectric coatings are also used.

To avoid tarnishment or oxidation, metallic reflective coatings require a superposed protective layer of silica, magnesium fluoride or other appropriate material. Both the reflective and protective coatings usually are extremely thin. In one particular embodiment, a primary mirror for a telescope, an aluminum reflective layer and a magnesium flouride over-coating have an aggregate thickness of about 1100 Angstroms. The thickness required depends on various factors, primarily on the coating material used and the wavelength of radiation to be reflected. For purposes of comparison, an aluminum coating for use in the visible range of the spectrum may need to be approximately twice as thick as for operation in the ultraviolet range of wavelengths.

The particular technique for applying the coating is not of the essence of the invention. Vacuum deposition is a well known and commonly employed method. A useful coating method is described in U.S. Pat. No. 4,217,855. For further information, general or particular, reference may be had to *Vacuum Depositions of Thin Films,* L. Holland, John Wiley & Sons, 1956.

Coefficient of thermal expansion is measured with standard well-known techniques. One such technique utilizes a dilatometer whereby a sample is heated while changes in length are measured by observation through a telescope device.

The ceramic compositions of the present invention are suitable for any application requiring low or nearly zero thermal expansion properties, such as for optical elements as described herein, for special purpose structural components in environments where dimensional stability is critical, as well as for more common place uses such as ceramic cooking ware, crucibles and the like.

EXAMPLE 1

A sample of composition with molecular formula $Na_{1.25}Zr_2(PO_4)_{2.75}(SiO_4)_{0.25}$ [x=0.25] in the x-series was prepared by a traditional ceramic synthesis technique using dry oxide powders. A stoichiometric mixture of $Na_2CO_3$, $ZrO_2$, $NH_4H_2PO_4$ and $SiO_2$ was homogenized in acetone by hand mixing in a mortar or by ball milling, and then let dry in air to remove acetone. The dry mixture was heat treated slowly at 200° C. for 16 hours, 600° C. for 4 hours and finally 900° C. for 16 hours to remove volatiles such as $CO_2$, $NH_3$ and $H_2O$. After this the calcined material was ground into fine powder (−35 mesh) and cold pressed into 2.5 cm diameter pellets at a pressure of 667 bar (10,000 psi) in order to prepare sintered ceramic compact samples. The pellets were fired at 1100° C. for two days. A rectangular bar (about $2 \times 0.5 \times 0.5$ cm$^3$) was cut from the sintered sample and used for thermal expansion measurements which were performed on a Harrop dilatometer with fused silica as a standard. The obtained thermal expansion curve is shown in FIG. 3 which gives curves (solid line) for several compositions of the present invention and, for comparison, for two compositions (broken lines) outside the scope of the present invention (x=Z=0; and x=1, 2=0). The curve for x=0.25 indicates moderately negative thermal expansion from 25° C. up to 500° C. for this particular composition. The average coefficient of thermal expansion $\alpha_{av}$ is $=-2.1 \times 10^{-6}/°C$.

EXAMPLE 2

A second composition with molecular formula $Na_{1.5}Zr_2(PO_4)_{2.5}(SiO_4)_{0.5}$ [x=0.5] in the x-series was also synthesized according to the same procedure as Example 1 and thermal expansion measurements were carried out in a similar manner. The resultant fractional change in length $\Delta L/L$ vs. temperature curve is shown in FIG. 3. It is evident from this plot that this composition initially exhibits slightly negative expansion and then gradually turns to positive with $\alpha_{av}$ (25°-500° C.) about $+2.5 + 10^{-6}/°C$. It is expected from the results of Examples 1 and 2 that there is an intermediate composition with zero coefficient of thermal expansion.

EXAMPLE 3

In order to investigate thermal expansion behavior of different compositions in z-series, the end member, z=0, with molecular formula $NaZr_2(PO_4)_3$ was synthesized following the same procedure as described in Example 1 except in the present case stoichiometric amounts of only $Na_2CO_3$, $ZrO_2$ and $NH_4H_2PO_4$ were used. The thermal expansion curve demonstrates that a negative coefficient of thermal expansion $\alpha_{av}$ is $-3.1 \times 10^{-6}/°C$., up to 500° C.

EXAMPLE 4

A composition in z-series where z=0.125 with molecular formula $Na_{1.5}Zr_{1.875}(PO_4)_3$ was prepared following the same procedure described in Example 1 and thermal expansion measurements (shown in FIG. 3) were made on rectangular bar cut from sintered sample. In this composition shrinkage has considerably reduced and $\alpha_{av}$ (25°-500° C.) was calculated to be $-1.6 \times 10^{-6}/°C$.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. An optical reflector characterized by resistance to distortion and fracture under variations in temperature, which comprises:

a substrate fabricated of low expansion (25° C.-500° C.) ceramic material and an optically reflecting film deposited on the substrate, the ceramic material being of single phase crystal structure having a composition represented by a molecular formula i (Na) j $(Zr_{2-z}Na_{4z})$ k $(P_{3-x}Na_xSi_x)O_{12}$ where i, j and k represent molar proportions and x and z represent atomic proportions of constituents respectively of the ceramic material, wherein:

molar proportions i, j and k are individually in the range from about 0.9 to about 1.1, and i+j+k is equal to 3; and for molar proportions i, j and k individually equal to 1.0, the composition falls within the area defined by the points A, B, C and D in the quaternary diagram of FIG. 2, the coordinates of the points being:

A: $x=0.2, z=0$
B: $x=0.6, z=0$
C: $x=0, z=0.25$
D: $x=0, z=0.125$

2. An optical reflector characterized by resistance to distortion and fracture under variations in temperature, which comprises:

a substrate fabricated of low expansion (25° C.-500° C.) ceramic material, and an optically reflecting film deposited on the substrate, the ceramic material being of single phase crystal structure having a composition represented by the molecular formula i (Na) j $(Zr_2)$ k $(P_{3-x}Na_xSi_x)O_{12}$ where i, j and k represent molar proportions of constituents respectively of the ceramic composition, wherein:

molar proportions i, j and k are individually in the range from about 0.9 to about 1.1, and i+j+k is equal to 3; and the composition falls within limits defined by atomic proportion x having a value in the range 0.4 to 0.6.

3. An optical reflector characterized by resistance to distortion and fracture under variations in temperature, which comprises:

a substrate of low expansion (25° C.-500° C.) ceramic material, and an optically reflecting film deposited on the substrate, the ceramic material being of single phase crystal structure having a composition represented by a molecular formula i (Na) j $(Zr_{2-z}Na_{4z})$ k $(P_3)O_{12}$ where i, j and k represent molar proportions of constituents respectively of the ceramic composition, wherein:

molar fractions i, j and k are individually in the range of about 0.9 to about 1.1, and i+j+k is equal to 3; and the ceramic composition falls within limits defined by atomic proportion z having a value in the range 0.125 and 0.25.

4. A method of supporting an optically reflecting film so as to resist distortion and fracture under variations in temperature, which comprises providing a substrate for the optically reflecting film, the substrate being a low expansion (25° C.-500° C.) ceramic material of a single phase crystal structure having a composition represented by the molecular formula i (Na) j $(Zr_{2-z}Na_{4z})$ k $(P_{3-x}Na_xSi_x)O_{12}$ where i, j and k represent molar fractions and x and z represent atomic fractions of constituents respectively of the ceramic composition, wherein:

molar fractions i, j and k are individually in the range from about 0.9 to about 1.1, and i+j+k is equal to 3; and for molar proportions i, j and k individually equal to 1.0, the ceramic composition falls within the area defined by the points A, B, C and D in the quaternary diagram of FIG. 2, the coordinates of the points being:

A: $x=0.2, z=0$
B: $x=0.6, z=0$
C: $x=0, z=0.25$
D: $x=0, z=0.125$

* * * * *